Jan. 15, 1935.   A. F. A. KING   1,988,318
ASH RECEPTACLE
Filed Jan. 17, 1934    3 Sheets-Sheet 1
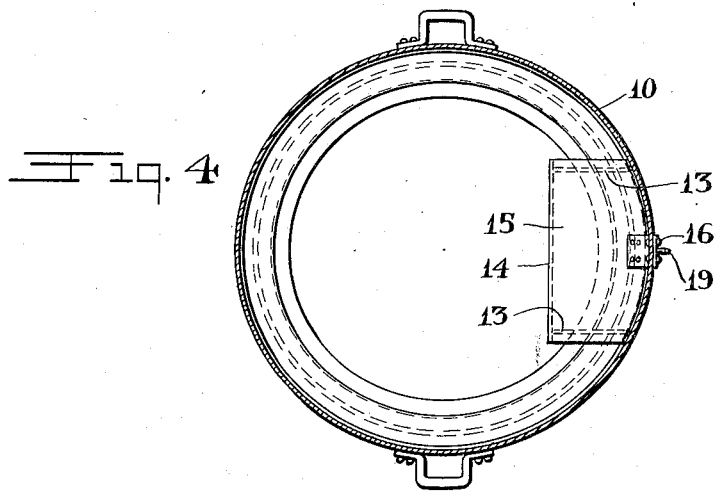
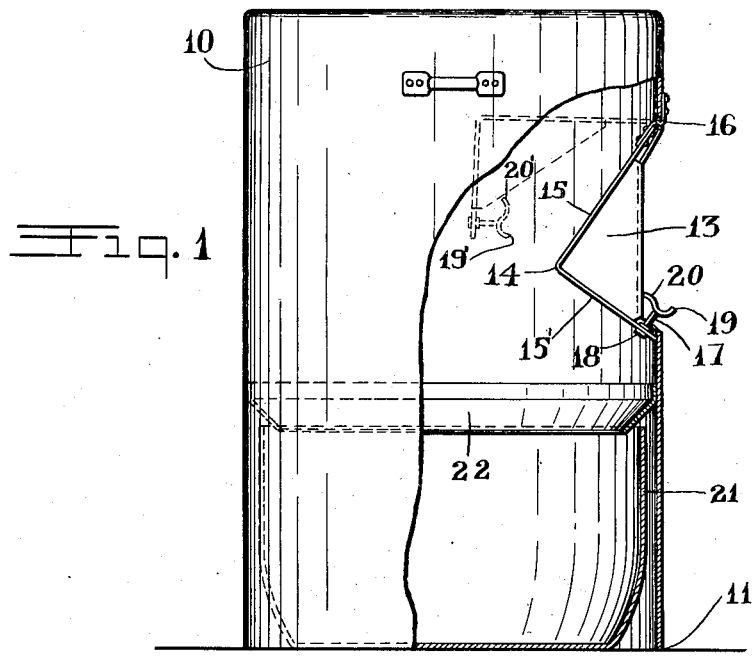
WITNESSES:
INVENTOR:
Albert F. A. King
BY
ATTORNEY Jan. 15, 1935.  A. F. A. KING  1,988,318
ASH RECEPTACLE
Filed Jan. 17, 1934   3 Sheets-Sheet 2
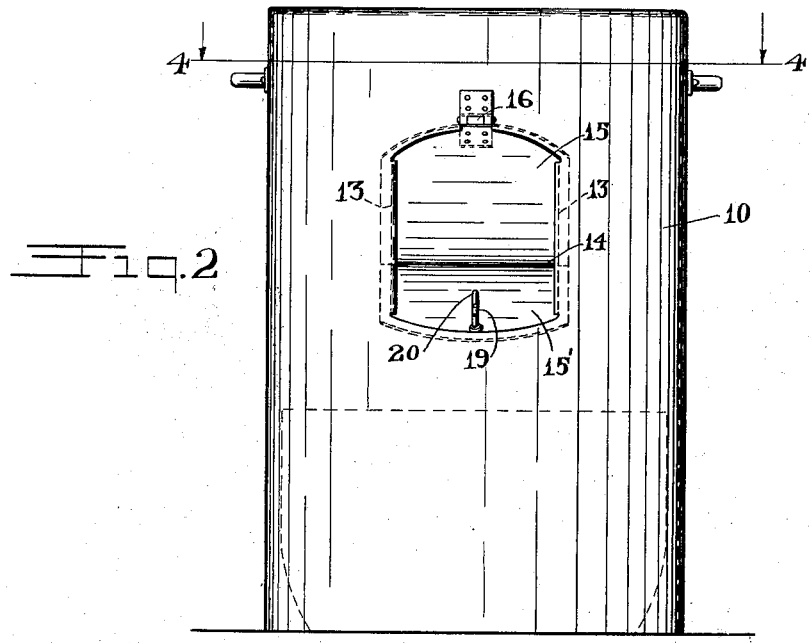
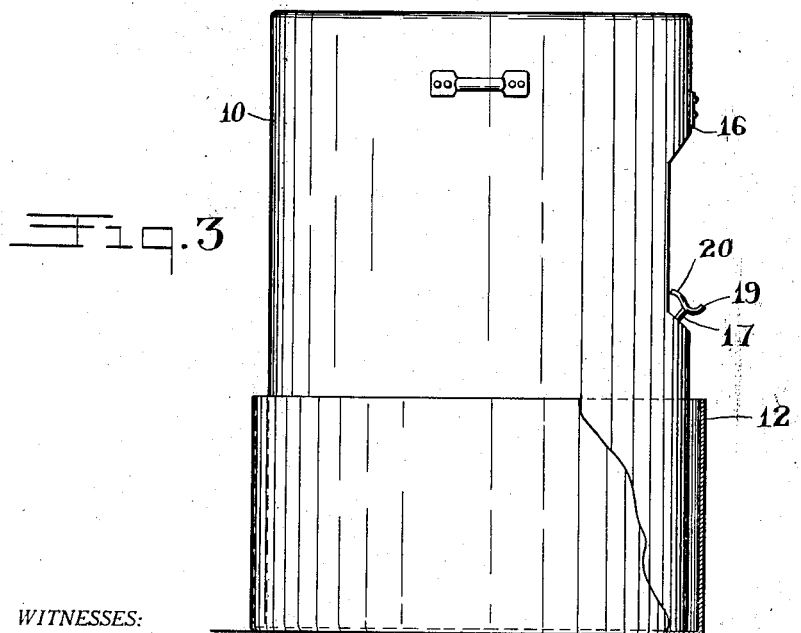
WITNESSES:
INVENTOR:
Albert F. A. King
BY
ATTORNEY Jan. 15, 1935. A. F. A. KING 1,988,318
ASH RECEPTACLE
Filed Jan. 17, 1934 3 Sheets-Sheet 3
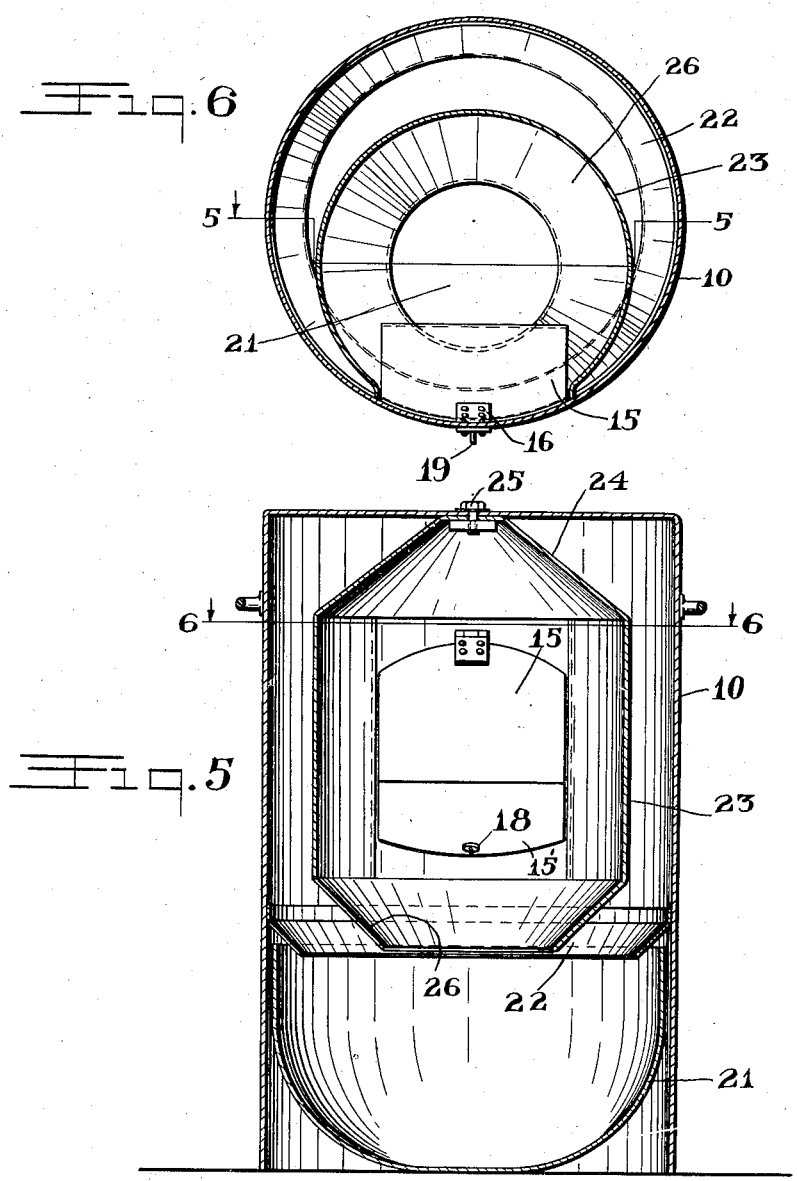
WITNESSES:
INVENTOR:
Albert F. A. King
BY
ATTORNEY Patented Jan. 15, 1935

1,988,318

UNITED STATES PATENT OFFICE 1,988,318

ASH RECEPTACLE

Albert F. A. King, Philadelphia, Pa.

Application January 17, 1934, Serial No. 706,914

7 Claims. (Cl. 220—30)

This invention relates to ash receptacles, and has for an object to provide a receptacle for preventing the escape of rising dust in a new and improved manner.

A further object of the invention is to provide an ash receptacle having an improved type of opening and closure at one side overlying a container properly positioned to receive ashes inserted through the opening.

A further object of the invention is to provide an ash receptacle having an opening through one side above the position for an underlying container, said opening having a closure which automatically closes, and provided with means for receiving and positioning a shovel relative to and for opening said closure.

A further object of the invention is to provide in connection with a closure for an ash receptacle a fork pivoted in said closure and so positioned that it may be properly engaged by a shovel for opening the closure and to rotate with the shovel for dumping the load of ashes.

The invention, therefore, comprises a receptacle which is adapted to seat over or into, or otherwise associated with a container having an opening formed in one side of the receptacle, with an L-shaped closure closing by its own weight, said closure carrying a pivoted fork in position to be engaged by the edge of the shovel for the purpose of, first, opening the closure, and second, supporting the shovel while being oscillated to dumping position.

The drawings illustrate an embodiment of the invention and the views therein are as follows:

Figure 1 is a view of the receptacle partially in side elevation, and with parts broken away showing the internal construction, Figure 2 is a view of the receptacle in front elevation, Figure 3 is a view of the receptacle wholly in side elevation with a container receiving the receptacle therein, Figure 4 is a sectional view taken on line 4—4 of Figure 2, Figure 5 is a vertical sectional view taken through a modified type of the receptacle, and Figure 6 is a transverse sectional view taken on line 6—6 of Figure 5 and showing line 5—5 as the plane of Figure 5.

Like characters of reference indicate corresponding parts throughout the several views.

The improved ash receptacle which forms the subject-matter of this application comprises the body 10 which may be of any size or form found desirable, and the showing in the drawings is merely illustrative, without limiting the invention to any such proportions or appearance.

Preferably, this receptacle will be open at the bottom so as to seat onto the floor, as indicated at 11 in Figure 1, or seat into the container 12, as shown at Figure 3, this depending wholly upon the nature of the container employed with the receptacle.

At one side the receptacle is cut away to form substantially parallel walls 13 approximately triangular in shape and extending within the receptacle. A closure is formed having an angle at 14, producing an upper part 15 and a lower part 15', which fits about the triangular margins of the walls 13.

This closure is hinged to the receptacle at 16, and by reason of its angular formation, its own weight will tend to hold it closed, as shown at Figure 1.

The closure is provided with a fork which is pivoted to the lower section 15'. This fork comprises a rod 17 pivoted at 18, and has tines 19 and 20.

When a shovel is introduced between the tines 19 and 20, and a push exerted thereon, the fork will move backwardly with the closure to the position shown in dotted lines at Figure 1, wherein the tines 19 and 20 are represented at 19' and 20'. In this position the shovel may be partially rotated so that the contents may be dumped into the underlying container, which is shown as contained within the receptacle 21 in Figure 1, or externally of the receptacle, as shown at 12 in Figure 3.

For the purpose of preventing the ashes from falling about the exterior of the container 21, which is contained within the receptacle, a petticoat 22 may be employed, as shown at Figure 1. In any event, the container will be selected by the user, whether within or without the receptacle, and the receptacle itself is adapted for cooperation with either type.

In the type shown at Figures 5 and 6, a drum 23 is positioned within the body. This drum may be associated with the body in various ways and attached by approved means. As shown, the drum is substantially cylindrical and set eccentric to the body 10, the two coinciding substantially at the position of the door 15 so that the door opens within the drum 23.

Also, as shown, the drum 23 is provided with a conical top 24 by means of which, and a bolt 25, the drum is secured within the body in addition to the means employed for securing the two at their coinciding position adjacent to the door.

The bottom of the drum is provided with a hopper 26 furnishing an opening immediately over the receptacle 21.

When ashes are introduced into the drum 23 by moving the door 15 as above outlined, the shovel will dump the ashes downwardly through the opening of the hopper 26. As the ashes enter the receptacle 21, the tendency of the dust is to spread outwardly radially from the center of the receptacle and will, therefore rise about the exterior of the drum 23. The inclination of the conical part 24 is intended to be greater than the angle of repose of dust thereon so that the dust will finally settle on said cone and slide downwardly along the sides of the drum and be directed by the petticoat 22 into the receptacle 21.

As the ash will largely spread as described, very little ash will be discharged as dust through the door opening in the short interval the shovel is holding such door in open position.

It will be obvious that in operation the receptacle may be lifted off from over or from within the container, depending upon the type of container employed. It may also be returned to such positions as are shown at Figure 1 or 3, and when so in position, a shovel loaded with ashes may be inserted, as just above described, by engaging the fork, and thereby pushing the closure to open position, as shown in dotted lines in Figure 1, when by rotary action the shovel may be tilted to dump the ashes.

The removal of the shovel permits the closure to close itself by reason of the weight extending beyond the pivot, as indicated by the point of angle 14.

Of course, the ash receptacle herein described may be modified and changed in various ways without departing from the invention herein set forth and hereafter claimed.

I claim:—

1. An ash receptacle comprising a body having an opening in the side thereof, a hinged closure tending to close by gravity for closing said opening, and a revoluble pivoted fork mounted upon the outer side of said closure.

2. An ash receptacle comprising a body having an opening in the side with internally extending spaced walls, a closure hinged to the body and adapted to close by gravity into engagement with the walls, and a revoluble fork carried upon the outer side of the closure.

3. An ash receptacle comprising a body having an opening in one side with parts turned inwardly to form triangular substantially parallel walls, a closure hinged to the upper side of the opening and formed in L-shape to correspond to and close against the edges of the triangular walls, and a fork pivoted to the lower part of the closure having tines spaced to receive the edge of a shovel therebetween and adapted to rotate under the action of the shovel when the closure is in open position swung within the receptacle.

4. An ash receptacle having a self-closing closure and a shovel receiving revoluble recessed member carried upon the outer side of the closure.

5. An ash receptacle comprising a body having a drum located therein and spaced therefrom forming a chamber about said drum, said drum being closed at the top and provided with an opening at the bottom, and a closure adapted to swing into the drum and to close automatically when the opening impulse is removed, the bottom of said drum being elevated above the bottom of the body providing a space for a receptacle.

6. An ash receptacle comprising a body, a drum within said body, said drum having a conical top and an open bottom, an opening through the side of the body and drum, a closure for closing said opening, and a hopper open at the bottom formed upon the lower end of the drum, the bottom of said drum being elevated above the bottom of the body providing a space for a receptacle.

7. An ash receptacle comprising a body having an inner drum fixed thereto and forming a space between the drum and the body and communicating with both the top and bottom of the body, and a closure from the exterior of the body to the interior of the drum, the bottom of said drum being elevated above the bottom of the body providing a space for a receptacle.

ALBERT F. A. KING.